US008917662B2

(12) United States Patent
Kim et al.

(10) Patent No.: US 8,917,662 B2
(45) Date of Patent: Dec. 23, 2014

(54) SERVER FOR CONTROL PLANE AT MOBILE COMMUNICATION NETWORK AND METHOD FOR CONTROLLING ESTABLISHMENT OF CONNECTION THEREOF

(75) Inventors: Tae-Hyeon Kim, Gyeonggi-Do (KR); Lae-Young Kim, Gyeonggi-Do (KR); Hyun-Sook Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 201 days.

(21) Appl. No.: 13/264,332

(22) PCT Filed: Apr. 30, 2010

(86) PCT No.: PCT/KR2010/002762
§ 371 (c)(1),
(2), (4) Date: Oct. 13, 2011

(87) PCT Pub. No.: WO2010/128773
PCT Pub. Date: Nov. 11, 2010

(65) Prior Publication Data
US 2012/0039304 A1 Feb. 16, 2012

Related U.S. Application Data

(60) Provisional application No. 61/175,773, filed on May 5, 2009, provisional application No. 61/218,075, filed
(Continued)

(30) Foreign Application Priority Data

Dec. 16, 2009 (KR) .................. 10-2009-0125729

(51) Int. Cl.
*H04W 36/08* (2009.01)
*H04W 28/08* (2009.01)
(Continued)

(52) U.S. Cl.
CPC ............... *H04W 28/08* (2013.01); *H04W 8/26* (2013.01); *H04W 76/022* (2013.01);
(Continued)

(58) Field of Classification Search
USPC .......................................... 370/241, 338, 328
See application file for complete search history.

(56) References Cited

U.S. PATENT DOCUMENTS 5,987,011 A 11/1999 Toh
2005/0165957 A1 7/2005 Choi et al.
(Continued)

FOREIGN PATENT DOCUMENTS

CN 100349419 C 11/2007
KR 10-2004-0046688 A 6/2004
KR 10-2005-0077340 A 8/2005

OTHER PUBLICATIONS

3GPP TS 22.220 V9.0.0 (Mar. 2009), 3rd Generation Partnership Project; Technical Specification Group Services and System Aspects; Service requirements for Home NodeBs and Home eNodeBs (Release 9).

*Primary Examiner* — Kevin C Harper
*Assistant Examiner* — Derrick V Rose
(74) *Attorney, Agent, or Firm* — Birch, Stewart, Kolasch & Birch, LLP

(57) ABSTRACT

Disclosed is a method of controlling connection establishment in a server in charge of the control plane within a mobile communication network. The method of controlling connection establishment may include receiving a connection request message including a parameter indicating an identifier of a local gateway from a base station. The connection request message may include an access request message by the UE. The method of controlling connection establishment may further include determining whether a bearer for the UE is set to a path through nodes within the mobile communication network or set to a path through nodes within another wired network accessible by the local gateway by considering at least one of QoS, subscriber information for the UE, operator policy if the connection request message is received. If it is set to a path through nodes within the another wired network, the method of controlling connection establishment may further include transmitting a connection response message including a parameter indicating whether the bearer has been set or should be set to a path through nodes within the another wired network and an address of the local gateway to the base station.

10 Claims, 7 Drawing Sheets

Related U.S. Application Data on Jun. 18, 2009, provisional application No. 61/221,557, filed on Jun. 30, 2009, provisional application No. 61/235,691, filed on Aug. 21, 2009, provisional application No. 61/236,545, filed on Aug. 25, 2009.

(51) Int. Cl.
*H04W 8/26* (2009.01)
*H04W 76/02* (2009.01)
*H04W 88/16* (2009.01)
*H04W 28/06* (2009.01)
*H04W 28/18* (2009.01)

(52) U.S. Cl.
CPC .............. *H04W 88/16* (2013.01); *H04W 28/06* (2013.01); *H04W 28/18* (2013.01); *H04W 76/02* (2013.01)
USPC .......................................... 370/328; 370/522

(56) References Cited

U.S. PATENT DOCUMENTS

| | | | |
|---|---|---|---|
| 2008/0132239 A1 | 6/2008 | Khetawat et al. | |
| 2009/0129335 A1 | 5/2009 | Lee et al. | |
| 2009/0257353 A1* | 10/2009 | Song et al. | 370/241 |
| 2010/0128709 A1* | 5/2010 | Liu et al. | 370/338 |
| 2010/0272013 A1* | 10/2010 | Horn et al. | 370/328 |

* cited by examiner

SERVER FOR CONTROL PLANE AT MOBILE COMMUNICATION NETWORK AND METHOD FOR CONTROLLING ESTABLISHMENT OF CONNECTION THEREOF

CROSS REFERENCE TO RELATED APPLICATIONS

This application is the National Phase of PCT/KR2010/002762 filed on Apr. 30, 2010, which claims the benefit under 35 U.S.C. 119(e) of U.S. Provisional Application Nos. 61/175,773; 61/218,075; 61/221,557; 61/235,691 and 61/236,545 filed on May 5, 2009; Jun. 18, 2009; Jun. 30, 2009; Aug. 21, 2009 and Aug. 25, 2009; respectively, and claims priority under 35 U.S.C. 119 (a) to patent application Ser. No. 10-2009M125729 filed in Republic of Korea on Dec. 16, 2009, all of which are hereby expressly incorporated by reference into the present application.

TECHNICAL FIELD

The present invention relates to a mobile communication system.

BACKGROUND ART

In order to cope with various forums and new technologies related to the 4th generation mobile communications, the 3rd Generation Partnership Project (3GPP) who enacts the technical standards of 3G mobile communication systems has proceeded with studies on the Long Term Evolution/System Architecture Evolution (LTE/SAE) technologies since the end of 2004 as a part of the effort to optimize and enhance the performance of 3GPP technologies.

The SAE led by 3GPP SA WG2 is a study on network technologies for the purpose of determining a network structure together with the LTE work of 3GPP TSG RAN and supporting mobility between heterogeneous networks. In recent years, the SAE has been considered one of the latest important standard issues in 3GPP. It is a work to develop a system supporting various radio access technologies on the basis of 3GPP IP systems, and has been progressed to aim at an optimized packet based system that minimizes a transmission delay with enhanced transmission capability.

A high-level reference model defined by 3GPP SA WG2 includes a non-roaming case and roaming cases having various scenarios, and the detailed description thereof is given in 3GPP standard documents TS 23.401 and TS 23.402. In FIG. 1, there is illustrated a structural diagram of a network in which the model is schematically reconfigured.

FIG. 1 is a structural diagram illustrating an evolved mobile communication network.

One of the distinctive characteristics of the network structure of FIG. 1 is that it is based on a 2-tier model having an eNode B of the Evolved UTRAN and a gateway of the core network. The eNode B has a similar function, although not exactly the same, to the eNode B and RNC of the existing UMTS system, and the gateway has a function similar to the SGSN/GGSN of the existing system.

Another distinctive characteristic is that the control plane and the user plane between the access system and the core network are exchanged with different interfaces. While one Iu interface exists between the RNC and the SGSN in the existing UMTS system, two separate interfaces, i.e., S1-MME and S1-U, are used in the Evolved Packet Core (SAE) system since the Mobility Management Entity (MME) 51 taking charge of the processing of a control signal is structured to be separated from the gateway (GW). For the GW, there are two types of gateways, a serving gateway (hereinafter, 'S-GW') 52 and a packet data network gateway (hereinafter, 'PDN-GW' or 'P-GW') 53.

FIG. 2 is a view illustrating a relation between (e)NodeB and Home (e)NodeB.

In the 3rd or 4th generation mobile communication systems, attempts continue to increase their cell capacity in order to support high-capacity and bi-directional services such as multimedia contents, streaming, and the like.

In other words, with the development of communication and widespread multimedia technologies, various high-capacity transmission technologies are required, and accordingly, a method of allocating more frequency resources is used to increase radio capacity, but there is a limit to allocate more frequency resources to a plurality of users with restricted frequency resources.

In order to increase cell capacity, there has been an approach in which high frequency bandwidth is used and the cell diameter is reduced. If a cell having a small cell radius such as a pico cell is applied, it is possible to use a higher bandwidth than the frequency that has been used in the existing cellular system, thereby providing an advantage capable of transmitting more information. However, more base stations should be installed in the same area, thereby having a disadvantage of high investment cost.

In recent years, a femto base station such as Home (e)NodeB 30 has been proposed among the approaches for increasing cell capacity using such a small cell.

Studies on the Home (e)NodeB 30 have been started by 3GPP Home (e)NodeB WG3, and also in recent years, actively proceeded by SA WG.

The (e)NodeB 20 illustrated in FIG. 2 corresponds to a macro base station, and the Home (e)NodeB 30 illustrated FIG. 2 may be a femto base station. This specification will be described based on the terms of 3GPP, and the term (e)NodeB is used when referring to both NodeB and eNodeB. Also, the term Home (e)NodeB is used when referring to both Home NodeB and Home eNodeB.

The interface illustrated in a dotted line denotes the transmission of control signals between the (e)NodeB 20 or Home (e)NodeB 30 and the MME 51. Also, the interface illustrated in a solid line denotes the transmission of data of the user plane.

FIG. 3 is a view illustrating a problem according to the related art.

As illustrated in FIG. 3, if traffic is overloaded or congested at an interface between the (e)NodeB 20 and the S-GW 52, or traffic is overloaded or congested at an interface between the Home (e)NodeB 30 and the S-GW 52, then downlink data to the UE 10 or upload data from the UE 10 is failed to be properly transmitted.

Also, if an interface between the S-GW 52 and the PDN-GW 53 or an interface between the PDN-GW 53 and an Internet Protocol (IP) service network of the mobile communication operator is overloaded or congested, then downlink data to the UE 10 or upload data from the UE 10 is failed to be properly transmitted.

Also, when UE is handed over from a cell being currently serviced to another cell, if the another cell is overloaded, then it will cause a problem of dropping the service of the UE.

In order to solve the foregoing problem, mobile communication operators have changed the S-GW 52 and the PDN-GW 53 to high-capacity devices or have installed more new devices, but it has a disadvantage of requiring very high cost. Furthermore, it has a disadvantage that the amount of transmitted or received data increases exponentially over time, and then overloaded in a short time.

On the other hand, various schemes for optimizing the S-GW 52 and the PDN-GW 53 without installing more mobile communication networks as described above have been presented. However, the amount of transmitted or received data have increased exponentially over time, thereby causing a difficulty in which the solutions presented up to now are useless in a short time.

DISCLOSURE OF INVENTION

Solution to Problem

An objective of the present invention is to solve the foregoing problems. In other words, an objective of the present invention is to reduce transmitted or received data through a mobile communication network, thereby solving the foregoing problem.

In order to accomplish the foregoing object, according to the present invention, there is provided a detailed procedure of allowing downlink data to the UE or uplink data from the UE to pass through nodes within another network that is not the mobile communication network.

On the other hand, in order to accomplish the foregoing object, according to the present invention, the UE is connected to a node within a local network (e.g., a home network in a house or office network in a company) through Home (e)NodeB, i.e., a base station, to transmit or receive data.

Specifically, in order to accomplish the foregoing object, according to the present invention, there is provided a method of controlling connection establishment in a server in charge of the control plane within a mobile communication network. The method of controlling connection establishment may include receiving a connection request message including a parameter indicating an identifier of a local gateway from a base station. The connection request message may include an access request message by the UE. The method of controlling connection establishment may further include determining whether a bearer for the UE is set to a path through nodes within the mobile communication network or set to a path through nodes within another wired network accessible by the local gateway by considering at least one of QoS, subscriber information for the UE, operator policy if the connection request message is received. If it is set to a path through nodes within the another wired network, the method of controlling connection establishment may further include transmitting a connection response message including a parameter indicating whether the bearer has been set or should be set to a path through nodes within the another wired network and an address of the local gateway to the base station.

On the other hand, in order to accomplish the foregoing object, according to the present invention, there is provided a server in charge of the control plane within a mobile communication network. The server may include a transceiver configured to receive a connection request message including a parameter indicating an identifier of a local gateway from a base station. The connection request message may include an access request message by the UE. The server may further include a processor configured to determine whether a bearer for the UE is set to a path through nodes within the mobile communication network or set to a path through nodes within another wired network accessible by the local gateway by considering at least one of QoS, subscriber information for the UE, operator policy if the connection request message is received. At this time, if it is set to a path through nodes within the another wired network, the processor may control the transceiver to transmit a connection response message including a parameter indicating whether the bearer has been set a path through nodes within the another wired network and an address of the local gateway to the base station.

According to the present invention, data transmitted or received through a mobile communication network is reduced, thereby solving the problem in the related art.

Therefore, according to the present invention, a mobile communication network is not overloaded, thereby reducing the cost of additional installation of devices.

In addition, according to the present invention, a detailed technology as to data of which UE is offloaded to a wired network or with which method data of the UE is offloaded is presented, thereby effectively managing a mobile communication network.

MODE FOR THE INVENTION

Figure 1:
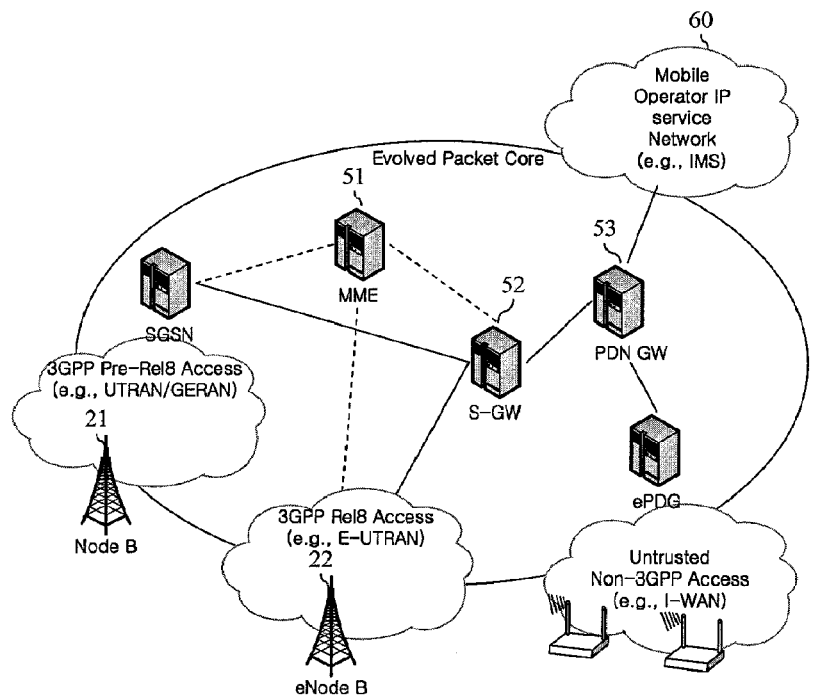
FIG. 1 is a structural diagram illustrating an evolved mobile communication network.
Figure 2:
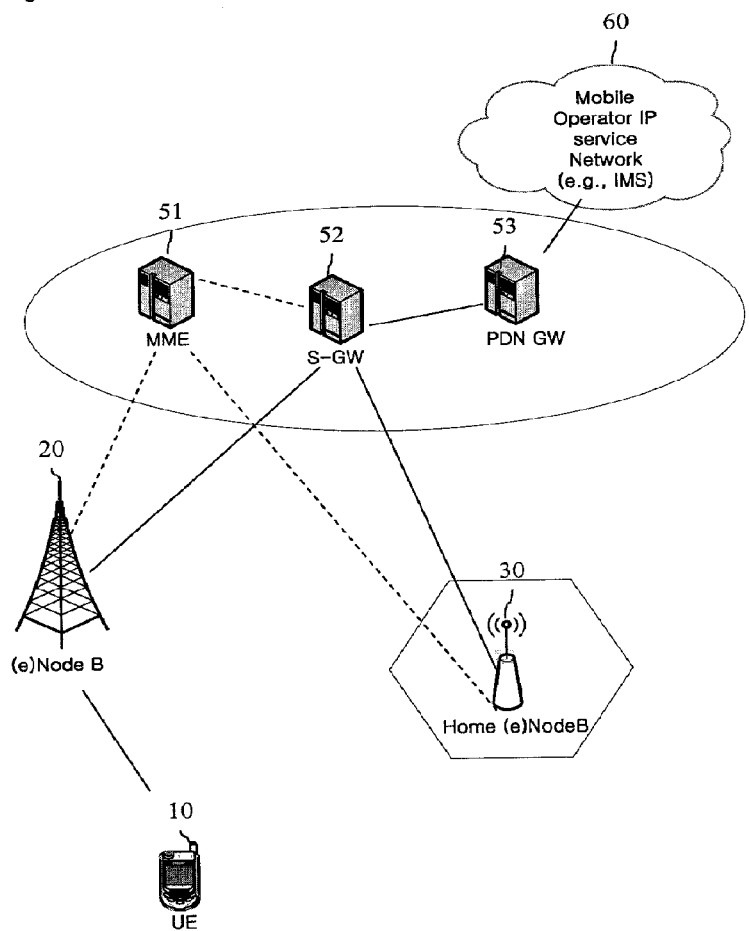
FIG. 2 is a view illustrating a relation between (e)NodeB and Home (e)NodeB.
Figure 3:
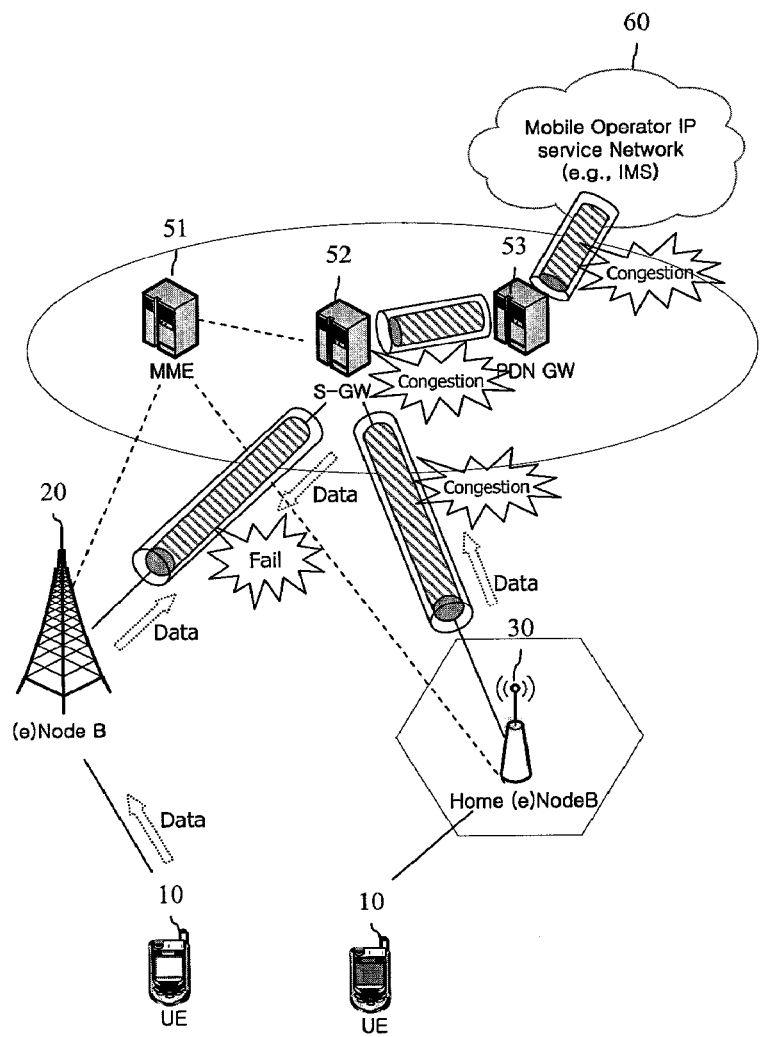
FIG. 3 is a view illustrating a problem according to the related art.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

Hereinafter, the term "terminal" is used, but the terminal may be also called a user equipment (UE), a mobile equipment (ME), and a mobile station (MS). Furthermore, the terminal may be portable equipment such as a portable phone, a PDA, a smart phone, and a notebook, or non-portable equipment such as a PC, and a vehicle-loaded device.

Furthermore, the term "Home (e)NodeB" is used below, but the Home (e)NodeB may be called a femto base station, a Home NodeB, and a Home eNodeB.

Definition Of Terms

Hereinafter, the terms used in this specification will be briefly defined prior to describing with reference to the drawings.

UMTS: It is an abbreviation of Universal Mobile Telecommunication System and denotes the 3rd mobile communication network.

EPS: It is an abbreviation of Evolved Packet System, and denotes a core network supporting a Long Term Evolution (LTE) network. It is a network in the form of an evolved UMTS.

APN (Access Point Name): As the name of an access point managed by a network, it is provided to the UE. Based on the name of the access point, a suitable PDN-GW for data transmission and reception.

Access Control: A control procedure for allowing the UE to be used at an access system such as Home (e)NodeB, or to be moved to another access system.

TEID (Tunnel Endpoint Identifier): An end point ID of a tunnel configured between nodes within a network. It is set up for each section in the unit of each bearer of the UE.

NodeB: It is installed outdoors as a base station of the UMTS network, and the size of the cell coverage corresponds to a macro cell.

eNodeB: It is installed outdoors as a base station of the Evolved Packet Core (EPC) network, and the size of the cell coverage corresponds to a macro cell.

(e)NodeB: It is a term indicating both NodeB and eNodeB.

Home NodeB: It is installed indoors as a base station of the UMTS network, and the size of the cell coverage corresponds to a femto cell.

Home eNodeB: It is installed indoors as a base station of the EPS network, and the size of the cell coverage corresponds to a femto cell.

Home (e)NodeB: It is a term indicating both Home NodeB and Home eNodeB.

Home (e)NodeB Gateway: It is connected to at least one Home (e)NodeB as a gateway performing a role of interfacing with a core network.

Home (e)NodeB Subsystem: It is a form of combining a Home (e)NodeB with a Home (e)NodeB Gateway into a set to manage a radio network. Both the Home (e)NodeB subsystem and the Home (e)NodeB perform a role of managing a radio network to linkwith a core network, and thus considered as an aggregate form. Accordingly, the terms "Home (e)NodeB" and "Home (e)NodeB subsystem" are interchangeably used below.

Closed Subscriber Group (CSG): It denotes a group having at least one Home (e)NodeB. The Home (e)NodeBs belonging to the CSG have a same CSG ID. Each user receives a license for each CSG.

Closed Access Mode: It denotes a mode in which a Home (e)NodeB is operated as a CSG cell. It operates in a method of allowing an access only to a user terminal that is allowed for the relevant cell. In other words, a terminal having an authority for the particular CSG IDs supported by a Home (e)NodeB is only accessible.

Open Access Mode: It denotes a mode in which a Home (e)NodeB is operated in a method similar to a normal cell (non-CSG cell) without the concept of CSG. In other words, it is operated like a normal (e)NodeB.

Hybrid Access Mode: It denotes a mode in which a Home (e)NodeB is operated as a CSG cell, but its access is also allowed to an non-CSG subscriber. The access is allowed for a user terminal having a particular CSG ID that can be supported by the relevant cell to provide a Home (e)NodeB service, and operated in a method in which even a terminal having no CSG authority is allowed to access.

Selected IP Traffic Offload (SIPTO): Technology for offloading traffic to a wired network such as the Internet or the like, without using a network of the mobile communication operator when the UE transmits specific IP traffic through Home (e)NodeB or (e)NodeB.

Local IP Access (LIPA): Technology for connecting Home (e)NodeB to a local network (home network in a house or office network in a company), and allowing UE within the Home (e)NodeB to be connected to the local network through the Home (e)NodeB.

Local Gateway: It denotes a gateway for enabling SIPTO or LIPA through the Home (e)NodeB or (e)NodeB. The local gateway is located between the Home (e)NodeB or (e)NodeB and a wired network, thereby creating a bearer between the Home (e)NodeB or (e)NodeB and the wired network, creating a bearer between the Home (e)NodeB and the local network, and enabling data transmission through the created bearer.

Description for the Concept of Schemes Proposed by this Specification

According to this specification, there is provided a technology of making a selected IP traffic offload, namely, SIPTO, to a path through nodes of a public network that is not the mobile communication network, i.e., nodes of a wired network, without transmitting or receiving specific IP traffic (for instance, Internet service) of the UE when (e)NodeB or Home (e)NodeB is supported in a mobile communication system such as 3GPP Universal Mobile Telecommunication System (UMTS)/Evolved Packet System (EPS). In addition, according to this specification, there is provided a technology, namely, LIPA, in which the UE transmits or receives data over a path through nodes within a local network (home network in a house or office network in a company) via Home (e)NodeB.

Furthermore, according to this specification, there is provided an architecture for implementing the SIPTO and LIPA technologies. Furthermore, according to this specification, there is provided schemes as to with which method data of the UE is offloaded to nodes within a different network that is not the mobile communication network in the SIPTO technology, and with which method a session is established.

Hereinafter, it will be described in detail with reference to the drawings.

Figure 4:
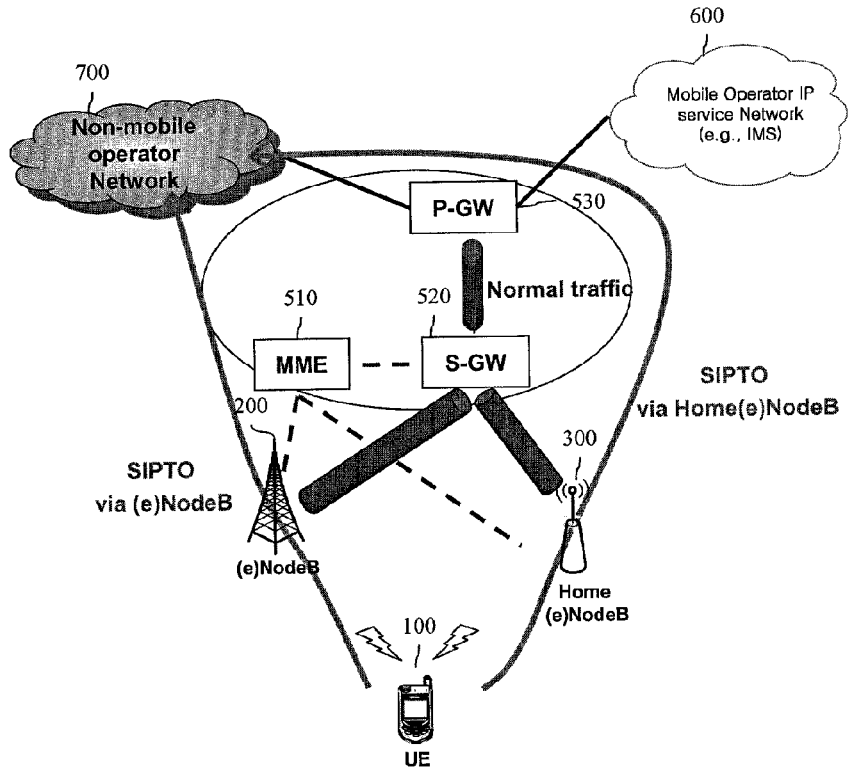
FIG. 4 is a view illustrating the concept of Selected IP Traffic Offload (SIPTO)

FIG. 4 is a view illustrating the concept of Selected IP Traffic Offload (SIPTO).

Referring to FIG. 4, a mobile communication system such an Evolved Packet System (EPS) is illustrated in an exemplary manner. The EPC system may include (e)NodeB 200, MME 510, S-GW 520, and P-GW 530. Furthermore, Home (e)NodeB 300 is illustrated therein.

As illustrated in the drawing, the Selected IP Traffic Offload (SIPTO) technology may allow specific IP traffic (for instance, Internet service) of the UE 100 to be offloaded to nodes of a wired network 700 without passing through nodes within an IP service network 600 of the mobile communication operator.

For example, if the UE 100 is allowed to access the Home (e)NodeB 300, then the UE 100 can access a wired network 700 such as a public communication network through the Home (e)NodeB 300.

On the other hand, the MME 510, S-GW 520, and P-GW 530 illustrated in FIG. 4 are on the basis of EPC, but SIPTO illustrated in FIG. 4 may be also applicable to a 3GPP Universal Mobile Telecommunication System (UMTS). In the 3GPP UMTS, both a control plane function of MME 510 and a user plane function of S-GW 520 are performed at a Serving GPRS Support Node (SGSN) (not shown).

Figure 5:
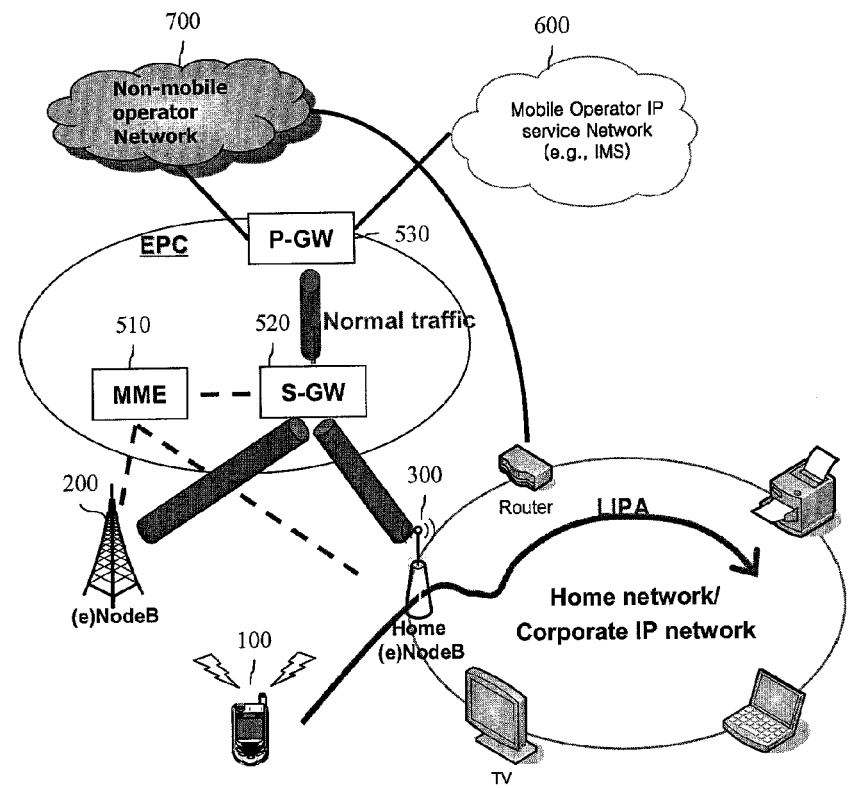
FIG. 5 is a view illustrating the concept of Local IP Access (LIPA)

FIG. 5 is a view illustrating the concept of Local IP Access (LIPA).

Referring to FIG. 5, the LIPA technology also allows the UE to make an access to a local network in a house or company through the Home (e)NodeB 300 if the UE 100 is allowed to access the Home (e)NodeB.

On the other hand, only the concept of the SIPTO and LIPA technologies has been described up to now. Hereinafter, it will be presented an architecture for implementing the foregoing concept. It will be also presented which operation should be performed for each entity within UMTS or EPC.

On the other hand, even though a transmission path of data through nodes of a wired network 700 has been presented, the UEs may not know the fact and continuously attempts to transmit or receive data through a mobile communication network 600 as usual, thereby causing a problem that an overload of entities within the EPC, for instance, S-GW and P-GW, may be continued if no proper action is taken. Accordingly, hereinafter, a detailed technology as to data of which UE is offloaded to a wired network or with which method data of the UE is offloaded will be presented, thereby solving the foregoing problems.

Also, a technology as to with which control method the UE is accessed to a local network within a house or company will be presented.

In addition, capabilities of all (e)NodeBs and all Home (e)NodeBs are identical in the related art. However, when SIPTO/LIPA is applied thereto, capability of each (e)NodeB and each Home (e)NodeB, for example, support or non-support for SIPTO/LIPA, differs from one another. The UE should be operated without recognizing the support or non-support in case of SIPTO, but the UE can use services (for example, home network services, etc.) if the LIPA function is supported. Thus, it has a problem that typical access may be attempted even in case where SIPTO/LIPA is supported; or on the contrary, it may be attempted and failed even in case where SIPTO/LIPA is not supported. Accordingly, hereinafter, a scheme for solving this problem will be presented.

Figure 6:
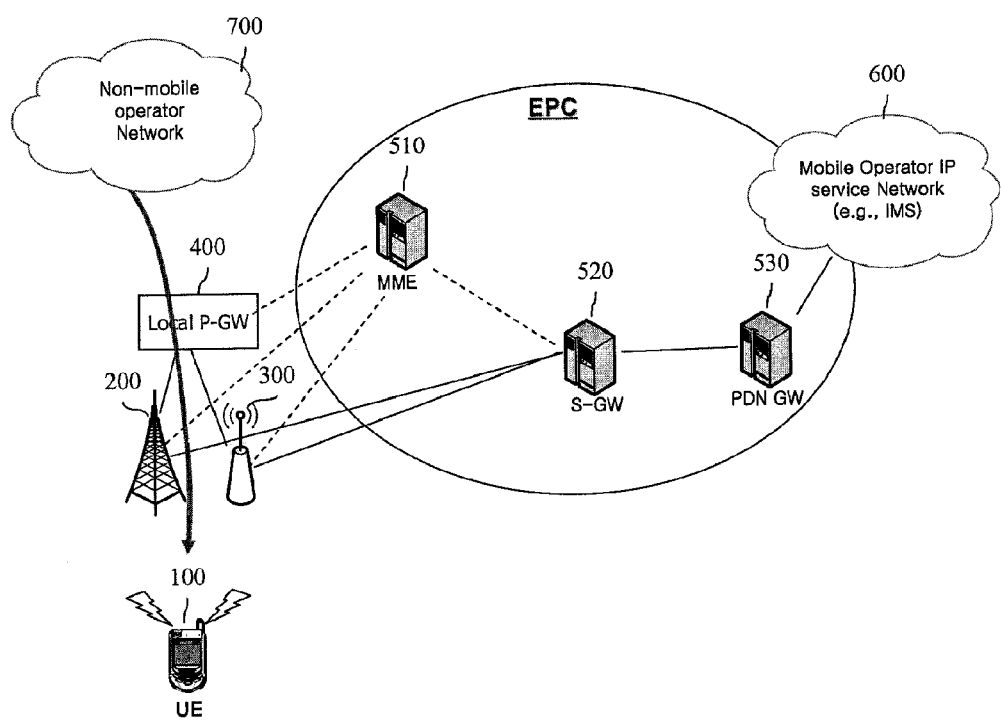
FIG. 6 is a view illustrating an architecture presented by the present invention for SIPTO or LIPA.

FIG. 6 is a view illustrating an architecture presented by the present invention for SIPTO or LIPA.

Referring to FIG. 6, according to the present invention, in order to support SIPTO or LIPA, there is provided a local gateway 400. The local gateway 400 is located between the (e)NodeB 200 or Home (e)NodeB 300 and a wired network 700, which is a gateway for enabling SIPTO through the (e)NodeB 200 or Home (e)NodeB 300 or enabling LIPA through the Home (e)NodeB 300. The local gateway 400 allows to create a bearer through a path between the Home (e)NodeB or (e)NodeB and the wired network 700, or allows to create a bearer through a path between the Home (e)NodeB and the wired network 700, thereby enabling data transmission through the created bearer.

As illustrated in FIG. 6, typical traffic of the UE 100 will be transferred to P-GW 530 via S-GW 520 through (e)NodeB 200 or Home (e)NodeB 300. However, traffic offloaded to a wired network 700 will be transferred to the local gateway 400 through (e)NodeB 200 or Home (e)NodeB 300. However, a paging control signal informing the UE that there is downlink data will be passed through the S-GW 520.

The local gateway 400 may include part or all of the PDN-GW function for an EPC system or may include part or all of the Gateway GPRS Support Node (GGSN) function for UMTS. However, the local gateway 400 enables to create a bearer through a path between the (e)NodeB 200 or Home (e)NodeB 300 and the wired network 700, or enables to create a bearer through a path between the Home (e)NodeB 300 and a local network within a house or office, and thus it is differentiated from S-GW 520 or GGSN creating a bearer through a path over the mobile communication network 600. Therefore, it may be called a local P-GW in EPC, or may be called a local GGSN in UMTS.

The operation of the local gateway 400, (e)NodeB 200, and Home (e)NodeB 300 in case of SIPTO may be different from the case of LIPA. Hereinafter, it will be described in detail.

First, the case of SIPTO will be described as follows.

In case of SIPTO, a bearer should be set up to pass through the UE 100, the Home (e)NodeB 300 or (e)NodeB 200, and nodes within the wired network 700. An access point provided through the wired network 700 such as a public network may be identical to the mobile communication network 600. Accordingly, the Access Point Name (APN) indicating the name of an access point may not be designated to the UE for SIPTO. Therefore, the UE may not use a specific APN when trying to access the (e)NodeB 200 or Home (e)NodeB 300. The UE may not use a specific APN when trying to access as described above, and thus an entity of the core network, for instance, MME 510 or Serving GPRS Support Node (SGSN) of EPC can determine whether or not an access of the UE 100 is offloaded to nodes of the mobile communication network 600. During the determination, the entity within the core network may consider support or non-support of SIPTO, operator policy, QoS, and the like, in the (e)NodeB 200 or Home (e)NodeB 300.

In other words, a control (control plane) for the bearer setup through the wired network 700 such as a public network is implemented through a core network, and an actual bearer (user plane) is created through the wired network 700 and the (e)NodeB or Home (e)NodeB.

Next, the case of LIPA will be described as follows.

In case of LIPA, a bearer is set up to pass through the UE 100, the Home (e)NodeB 300, and a node within a local network in a house or company. For this purpose, the local gateway 400, namely, local P-GW or local GGSN, is allowed to set up the bearer. The local network in a house or company causes a security problem when accessed by all the UEs, and thus it presupposes that the UE is subscribed to CSG. Furthermore, services provided through the local network in a house or company, for instance, Digital Living Network Alliance (DLNA) services, services of controlling Home Appliance, and the like, may be different from access services provided through the mobile communication network 600, and thus the Access Point Name (APN) indicating the name of an access point provided by the LIPA may be separately designated to the UE.

In order to access the local network, the UE 100 makes a bearer setup request to an entity within a core network through the Home (e)NodeB 300 using a specific APN. In other words, a control (control plane) for the bearer setup request to use the local network is implemented by the core network, and an actual bearer (user plane) is created between nodes within the local network through the Home (e)NodeB. The entity within a core network determines about the bearer setup request by considering whether it is an access through the Home (e)NodeB, whether it can be accessed to a local network, CSG, and the like.

On the other hand, the UE uses a specific APN for LIPA. For this purpose, the entity of a core network is able to inform that the Home (e)NodeB provides a LIPA function when the UE is registered or attached thereto. Whether or not the LIPA function is provided may be informed through a LIPA available message or indicator, for instance, LIPA_Available_indicator. The LIPA_Available_indicator is used to inform the UE that the LIPA function is available in the Home (e)NodeB.

Hereinafter, referring to FIGS. 7 and 8, a detailed control procedure for SIPTO/LIPA will be described according to a first and a second embodiment.

In order to promote the understanding about the detailed control procedure, it will be briefly described as follows. When the UE 100 is accessed or attached to a core network through the (e)NodeB 200 or Home (e)NodeB 300, the (e)NodeB 200 or Home (e)NodeB 300 transfers LIPA/SIPTO related information (local gateway (local GGSN or local P-GW) address, capability information for at least one of LIPA and SIPTO, etc.) to MME 510 (or SGSN in case of UMTS) in charge of the control function thereof.

The LIPA/SIPTO related information may include the following parameters. An example of using the following parameters will be described in FIGS. 7 and 8, respectively.

SIPTO_capability_indicator: Denotes that (e)NodeB or Home (e)Node supports SIPTO.

LIPA_capability_indicator: Denotes that Home(e)NodeB support a LIPA function.

Capability indicator for SIPTO or LIPA: Denotes that (e)NodeB supports SIPTO or Home(e)NodeB supports at least one of SIPTO and LIPA.

Local P-GW/Local GGSN identity for SIPTO: Denotes an identifier (id), or address for a local P-GW or local GGSN, or identification information within an address or network, or the like, to support SIPTO.

Local P-GW/Local GGSN identity for LIPA: Denotes an identifier (id), or address for a local P-GW or local GGSN, or identification information within an address or network, or the like, to support LIPA.

Local P-GW/Local GGSN identity: Denotes an identifier or address for a local P-GW or local GGSN.

The MME 510 (or SGSN in case of UMTS) determines whether to enable SIPTO or LIPA based on the received information. In other words, the MME 510 (or SGSN in case of UMTS) determines whether or not a bearer of the UE is set up to pass through a node within the wired network 700. Alternatively, the MME 510 (or SGSN in case of UMTS) determines whether or not a bearer of the UE is set up to pass through a path via a node within a local network in a house or company. The MME transmits a message or indicator indicating what is a bearer to be set based on the determination to the (e)NodeB 200, Home (e)NodeB 300 or S-GW 520, thereby performing a bearer or PDN connectivity related processing to create a LIPA or SIPTO bearer, adjust the QoS of the created bearer, or the like. The indicator may be LIPA-_Bearer_indicator or SIPTO_Bearer_indicator. Otherwise, the indicator may be LIPA/SIPTO_Bear_indicator. The LIPA_Bearer_indicator indicates that the setup bearer is LIPA. The SIPTO_Bearer_indicator indicates that the setup bearer is SIPTO. The LIPA/SIPTO_Bear_indicator indicates that the setup bearer is LIPA or SIPTO.

At this time, the MME 510 (SGSN in case of UMTS) may consider operator policy, QoS, and subscriber information in addition to the received information.

On the other hand, the MME 510 can store the received information in the storage, for instance, MM/EPS Bearer context for each UE. Furthermore, the MME 510 may differentiate QoS, mobility, and the like, in the bearer of each UE. For example, the MME 510 may apply QoS to the bearer of LIPA or SIPTO in a different manner from the bearer passing through the mobile communication network. Alternatively, the MME 510 may be allowed not to support mobility for the bearer of LIPA. Hereinafter, it will be described in more detail.

Figure 7:
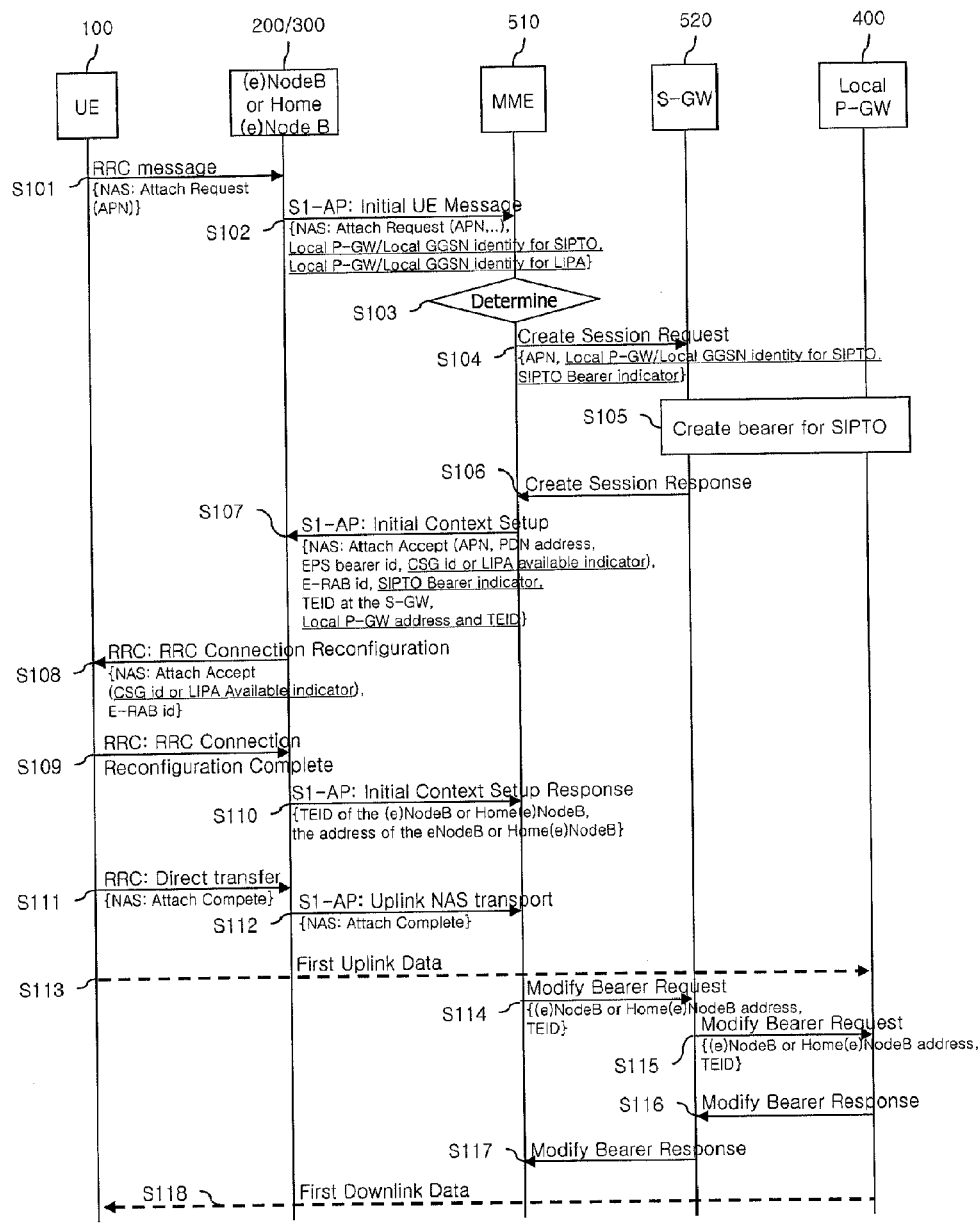
FIG. 7 is a flow chart illustrating a control procedure of SIPTO/LIPA according to a first embodiment of the present invention.

FIG. 7 is a flow chart illustrating a control procedure of SIPTO/LIPA according to a first embodiment of the present invention. FIG. 8 is an exemplary view illustrating a protocol of the message illustrated in FIG. 7.

Prior to specifically describing each procedure with reference to FIG. 7, messages illustrated in FIG. 7 will be briefly described as follows.

The messages transmitted or received between the UE 100 and the (e)NodeB 200 or Home (e)NodeB 300 are based on the Radio Resource Control (RRC) protocol. The messages transmitted or received between the (e)NodeB 200 or Home (e)NodeB 300 and the MME 510 SGSN (not shown) are based the S1 Application Protocol (S1-AP).

The messages transmitted or received between the UE 100 and the MME 510 or SGSN (not shown) are based on the Non-Access Stratum (NAS) protocol. The messages based on the NAS protocol are encapsulated in a message based on the RRC protocol and the S1-AP message and then transmitted. Hereinafter, each procedure will be described in detail with reference to FIG. 7.

1) First, the UE 100 generates an access request message, i.e., Attach Request message illustrated in the drawing, to be accessed or attached to an entity within the mobile communication network, i.e., MME 510. The message includes APN indicating the name of an access point for providing services to the UE 100. Furthermore, the access request message, i.e., Attach Request message is encapsulated in a message based on the RRC protocol, and the encapsulated message is transmitted to the (e)NodeB 200 or Home (e)NodeB 300 (S101).

2) If the RRC message is received from the UE 100, then the (e)NodeB 200 or Home (e)NodeB 300 extracts the access request message, i.e., Attach Request message included in the RRC message. Then, LIPA/SIPTO related information is added together with the extracted message to generate a connection request message, i.e., Initial message, and then the generated message is transmitted to the MME 510 (S102). The connection request message, i.e., initial message, is based on S1-AP. The initial message may be an Initial UE message as illustrated in the drawing.

The LIPA/SIPTO related information may include at least one of parameters shown in Table 1.

TABLE 1

| Parameter | Description |
| --- | --- |
| Local P-GW/Local GGSN identity for SIPTO | Denotes an identifier (id), or address for a local P-GW or local GGSN, or identification information within a network, or the like, to support SIPTO. |
| Local P-GW/Local GGSN identity for LIPA | Denotes an identifier (id), or address for a local P-GW or local GGSN, or identification information within a network, or the like, to support LIPA. |

The parameters are address information of a local P-GW or local GGSN to be used when setting up a bearer.

At this time, in case of Home (e)NodeB 300, both LIPA and SIPTO may be supported, or only either one may be supported, and thus the two parameters may be included or only either one may be included. In other words, in case of supporting both LIPA and SIPTO, both the two parameters are included. In case of supporting SIPTO only, the Local P-GW/Local GGSN identity for SIPTO parameter will be only included. Alternatively, in case of supporting LIPA only, the Local P-GW/Local GGSN identity for LIPA will be only included.

3) If the connection request message, i.e., Initial message is received, then the MME 510 extracts the access request message, i.e., Attach Request message within the connection request message, i.e., Initial message. Then, the MME 510 extracts the SIPTO/LIPA related information from the connection request message, i.e., Initial message. The MME 510 stores the extracted SIPTO/LIPA related information.

Subsequently, the MME 510 (SGSN in case of UMTS) determines whether to enable SIPTO or LIPA based on the APN, the SIPTO/LIPA related information, required QoS, operator policy, subscription information of the UE, and the like. In other words, the MME 510 determines whether or not the bearer of the UE will be set up to pass through a path via a node within a local network in a house or office. Otherwise, the MME 510 determines whether or not the bearer of the UE 100 will be set up to pass through a path via nodes within the mobile communication network 600 (S103). For example, if it is indicated by the SIPTO/LIPA related information that the (e)NodeB or Home (e)NodeB supports SIPTO, then the MME 510 checks subscription information of the UE. The subscription information of the UE may be received from HLR/HSS. At this time, the policy may be additionally checked. If SIPTO is supported for the UE by the subscription information, then the MME 510 may consider the QoS of the bearer required for the UE. At this time, if the QoS of the bearer that can be set up by using the SIPTO satisfies the required Qos, then the MME 510 may determine to provide SIPTO services to the UE. In other words, the MME 510 can set up the bearer of the UE to pass through a path via nodes within the wired network 700 such as a public network.

4) If it is determined that the bearer of the UE is processed by SIPTO as described above, then the MME 510 transmits a session creation request message, for instance, Create Session Request message, including the APN, the identifier information of the local P-GW (i.e., Local P-GW/Local GGSN identity for SIPTO parameter) to S-GW 520 (S104). The session creation request message may include a parameter indicating that SIPTO can be supported or a dedicated parameter (for instance, SIPTO Bearer indicator illustrated in the drawing).

5) If the session creation request message is received, then the S-GW 520 checks a parameter within the session creation request message, SIPTO Bearer Indicator. If there exists the parameter, for instance, SIPTO Bearer Indicator, then the S-GW 520 sets up a bearer with the local P-GW 400 using identifier information of the local P-GW (S105).

6) If the bearer is created, then the S-GW 520 transmits a bearer creation response message (Create Session Response message) or bearer creation completion message to the MME 510 (S106).

7) If the bearer creation response message or bearer creation completion message is received, then the MME 510 generates an access approval message or attach acceptance message (for instance, Attach Accept message). The generated message may be based on the NAS protocol. The generated message may include APN, PDN address, EPC bearer id, and CSG ID. Alternatively, in case of providing the LIPA, the generated message may further include a parameter indicating that LIPA is supported or a dedicated parameter (LIPA available indicator).

Subsequently, the MME 510 encapsulates the generated message in a connection response message, i.e., Initial Context Setup Response message based on S1-AP. The connection request message, i.e., Initial Context Setup Response message includes an E-RAB id parameter, a parameter indicating that the created bearer is SIPTO or a dedicated parameter (for instance, SIPTO Bearer indicator). The E-RAB id parameter indicates an id of the created bearer. The SIPTO Bearer indicator indicates that a bearer identified by the E-RAB id parameter is a SIPTO available bearer.

On the other hand, the connection response message, i.e., Initial Context Setup Response message may further include a parameter indicating a TEID at the S-GW, and a parameter indicating an address of the local P-GW and a TEID at the local P-GW. Using the TEID at the local P-GW and the address of the local P-GW, the (e)NodeB 200 or Home (e)NodeB 300 can transmit uplink data of the UE directly to the local P-GW without passing through the S-GW.

Subsequently, the MME 510 transmits the Initial Context Setup Response message to the (e)NodeB 200 or Home (e)NodeB 300 (S107).

8) If the connection response message, i.e., Initial Context Setup Response message is received, then the (e)NodeB 200 or Home (e)NodeB 300 extracts the access approval message or attach acceptance message, and then encapsulates the extracted message in a RRC connection reconfiguration message. At this time, the (e)NodeB 200 or Home (e)NodeB 300 may exclude some of the parameters within the extracted message, or may include all the parameters as they are. The RRC connection reconfiguration message may include at least one of the parameters existed in the Initial Context Setup Response message. In an exemplary manner, it is illustrated in FIG. 7 that the E-RAB id parameter is included within the RRC connection reconfiguration message.

The (e)NodeB 200 or Home (e)NodeB 300 transmits the RRC connection reconfiguration message to the UE 100 (S108).

9) If the RRC connection reconfiguration message is received, then the UE 100 transmits the RRC connection reconfiguration message to the (e)NodeB 200 or Home (e)NodeB 300 (S109).

10) The (e)NodeB 200 or Home (e)NodeB 300 transmits an initial context setup response message based on S1-AP to the MME 510 (S110). The initial context setup response message may include the TEID and address of the (e)NodeB 200 or Home (e)NodeB 300, and is transmitted to the local P-GW 400 for downlink data transmission.

11) The UE 100 generates a NAS-based access completion message, a connection completion message or Attach Complete message, and encapsulates the generated message in an RRC-based direct transfer message for transmission (S111).

12) The (e)NodeB 200 or Home (e)NodeB 300 extracts the access completion message, connection completion message or Attach Complete message from the direct transfer message, and then encapsulates the extracted message in an S1-AP-based Uplink NAS Transport message to transmit to the MME 510 (S112).

13) Then, if there exists uplink data to be transmitted, the UE 100 can transmit the data to the local P-GW 400 via the (e)NodeB 200 or Home (e)NodeB 300 (S113).

14) On the other hand, the MME 510 transmits a bearer modification request message, for instance, Modify Bearer Request message, to the S-GW 520 to modify the S-GW 520 within a core network and the created bearer (S114). At this time, in order to allow the local P-GW 400 to transmit the downlink data to the UE 100, the address and TEID of the (e)NodeB and Home (e)NodeB may be included within the bearer modification request message.

15) The S-GW 520 transmits the bearer modification request message to the local P-GW 400 (S115).

16-17) In response to the bearer modification request message, the local P-GW 400 transmits a bearer modification response message, for instance, Modify Bearer Response message (S116), and the S-GW 520 transfers the bearer modification response message to the MME 510 (S117).

Hereby, a downlink bearer setup between the local P-GW 400 and the (e)NodeB or Home (e)NodeB will be completed.

18) Then, if there exists downlink data to the UE, then the local P-GW 400 can transmit the data through the setup bearer (S118).

As described above, though MME 510 and S-GW 520 are illustrated on the basis of EPC in FIG. 7, the concept of the present invention may be also applicable to UMTS. In case of UMTS, both the MME 510 and S-GW 520 can be integrated into SGSN. As a result, signal transmission and reception between the MME 510 and the S-GW 520 illustrated in FIG. 7 will not implemented, but will be all processed within the SGSN.

Figure 9:
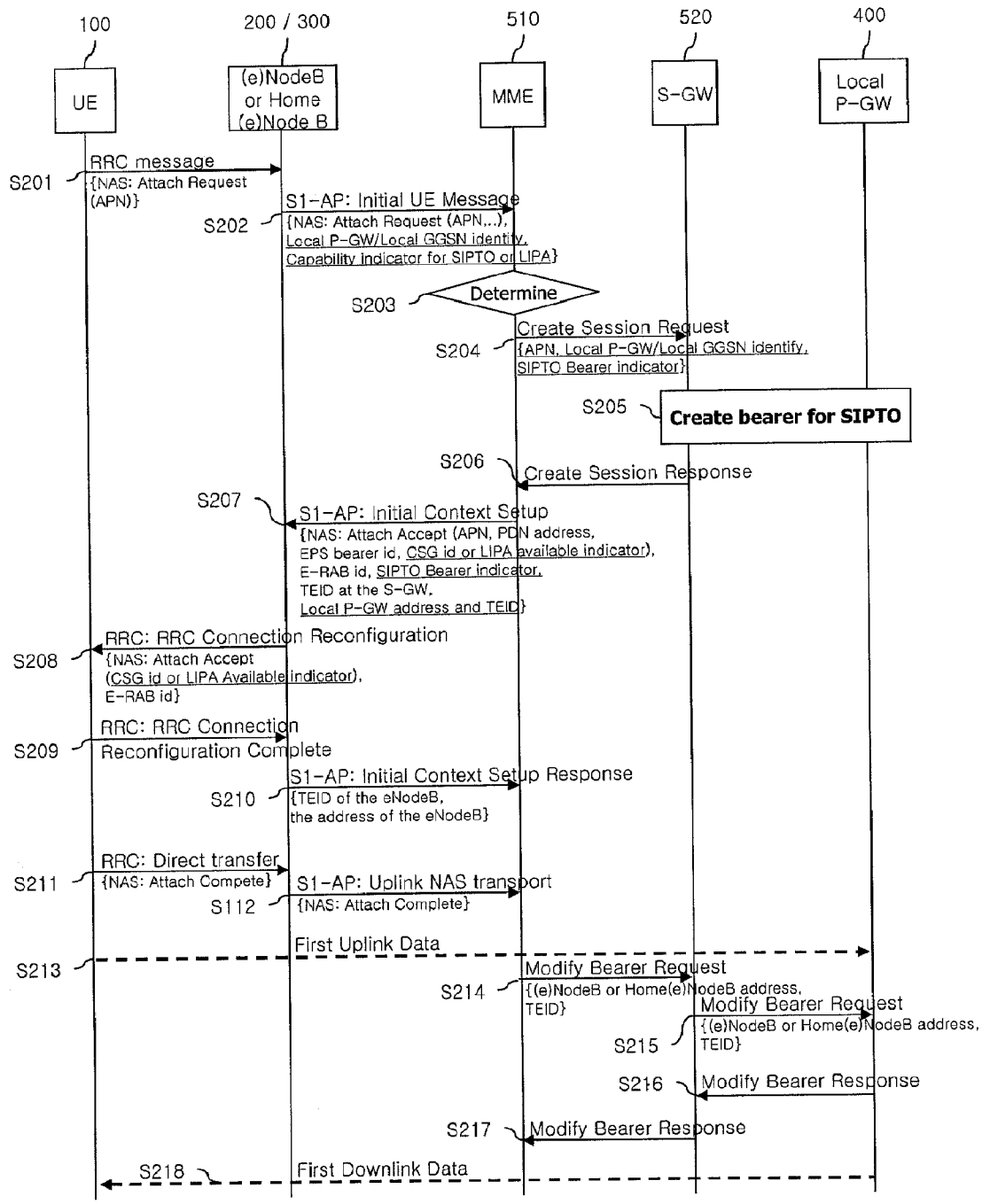
FIG. 9 is a flow chart illustrating a control procedure of SIPTO/LIPA according to a second embodiment of the present invention.

FIG. 9 is a flow chart illustrating a control procedure of SIPTO/LIPA according to a second embodiment of the present invention.

The second embodiment illustrated in FIG. 9 is similar to the first embodiment illustrated in FIG. 7. Their differences will be mainly described below, but the description of FIG. 7 will be used for their similarities.

First, the process S201 is similar to the process S101, and thus the description of S101 will be used.

If the RRC message is received from the UE 100, then the (e)NodeB 200 or Home (e)NodeB 300 extracts the access request message, i.e., Attach Request message included in the RRC message. Then, LIPA/SIPTO related information is added together with the extracted message to generate a connection request message, i.e., Initial message, and then the generated message is transmitted to the MME 510 (S102). The connection request message, i.e., Initial message, is based on S1-AP. The connection request message, i.e., Initial message may be an Initial UE message as illustrated in the drawing.

The LIPA/SIPTO related information may include at least one of parameters shown in Table 2.

TABLE 2

| Parameter | Description |
| --- | --- |
| Local P-GW/Local GGSN identity | Denotes an identifier (id), or address for a local P-GW or local GGSN, or identification information within a network, or the like. |
| Capability indicator for SIPTO or LIPA | Indicates whether Home (e)NodeB supports both SIPTO and LIPA, or supports only SIPTO, or supports only LIPA. Otherwise, indicates whether (e)NodeB supports SIPTO. |

The processes S203 through S217 are similar to the processes S103 through S117 in FIG. 7, and thus the description of FIG. 7 will be used.

Figure 8:
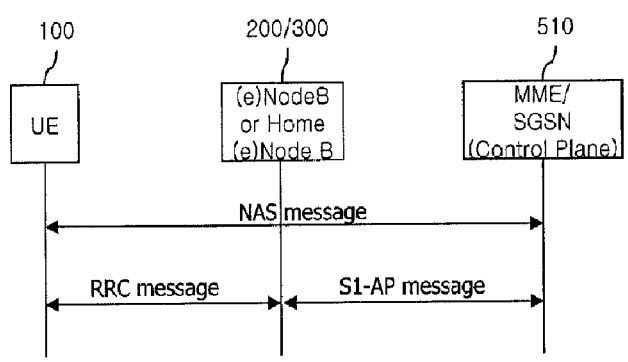
FIG. 8 is an exemplary view illustrating a protocol of the message illustrated in FIG. 7.

Up to now, a case where the UE 100 requests an access to the MME 510 has been described with reference to FIGS. 7 through 9, but the gist of the present invention as illustrated in FIGS. 7 through 9 will not be limited to this. For example, the UE 100 has been attached to the MME 510 to create a bearer, but the determination as to whether or not SIPTO is applied may be performed if the UE 100 requests the setup of a new bearer. Specifically, the foregoing method will be applied in case where the UE 100 requests the creation of a new bearer in order to request another access service.

Alternatively, the foregoing method will be applied in a case where the UE 100 is attached to a core network in a typical manner to create a bearer and transmit or receive data, but a service request is transmitted to the MME or SGSN to allow the created bearer to be offloaded to the wired network 700 when needed.

On the other hand, in case of the Home (e)NodeB or local gateway, it is installed by connecting to a wired network. In case where the wired network uses a dynamic IP, the address may be changed frequently. Accordingly, whenever the address or other information is changed, the changed information may be transferred to the MME 510 or SGSN. At this time, the LIPA/SIPTO related information of each (e)NodeB or Home (e)NodeB may be transferred together with the changed information.

Using the transferred information as described above, the MME 510 may determine whether or not LIPA/SIPTO will be applied, when the UE is handed over, or when the UE performs cell reselection, or when the UE performs Tracking Area Update (TAU), as well as when the UE 100 requests an access to the MME 510 as illustrated in FIGS. 7 through 9.

As described up to this point, a method according to the present invention can be realized by software, hardware, or their combination. For example, a method according to the present invention may be stored in a storage medium (e.g., internal terminal, flash memory, hard disk, etc.), and may be realized by codes or commands within a software program that is executable by a processor, such as microprocessor, controller, microcontroller, application specific integrated circuit (ASIC). It will be described with reference to FIG. 10.

Figure 10:
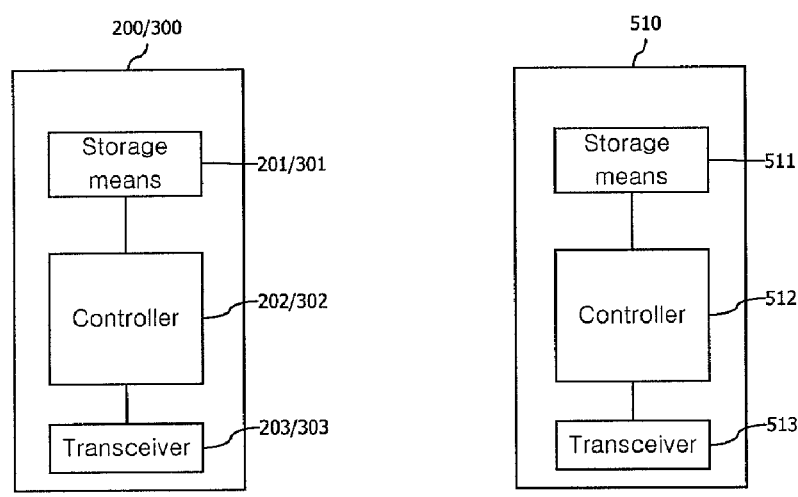
FIG. 10 is a configuration block diagram of (e)NodeB 200/Home (e)NodeB 300 and MME 510.

FIG. 10 is a configuration block diagram of the (e)NodeB 200/Home (e)NodeB 300 and the MME 510 according to the present invention.

As illustrated in FIG. 10, the (e)NodeB 200/Home (e)NodeB 300 may include a storage means 201/301, a controller 202/302, and a transceiver 203/303.

The MME 510 may include a storage means 511, a controller 512, and a transceiver 513.

The storage means store a software program in which a method illustrated in FIGS. 4 through 9 is realized.

Each of the controllers controls the storage means and the transceivers respectively. Specifically, the controllers implement each of the foregoing methods stored in the storage means respectively. Then, each of the controllers transmits the foregoing signals through the transceivers.

Though preferred embodiments of present invention are exemplarily described as disclosed above, the scope of the invention is not limited to those specific embodiments, and thus various modifications, variations, and improvements can be made to the present invention without departing from the spirit of the invention, and within the scope of the appended claims.

The invention claimed is:

1. A method of controlling connection establishment within a mobile communication network, the method comprising:
receiving, by a network entity from a base station, a connection request message when the base station receives a Radio Resource Control (RRC) message including an access request message from a User Equipment (UE), wherein the connection request message is generated by extracting an Attach Request message from the UE and by adding an identifier of a local gateway and capability information indicating whether the base station supports Selected Internet Protocol Traffic Offload (SIPTO);
determining, by the network entity, whether a bearer for the UE is set to a path through nodes within the mobile communication network or set to a path through nodes within another wired network accessible by the local gateway, by considering Quality of Service (QoS), subscriber information for the UE, operator policy and the capability information if the connection request message is received; and
transmitting, by the network entity to the base station, a connection response message if it is determined that the bearer is set to a path through nodes within the another wired network, wherein the connection response message includes a parameter indicating whether the bearer has been set or should be set to a path through nodes within the another wired network and an address of the local gateway to the base station, and
wherein the connection request message and the connection response message are S1 Application Protocol (S1-AP) messages.

2. The method of claim 1, wherein the access request message is the Attach Request message and comprises a navigation access server (NAS) parameter.

3. The method of claim 1, wherein the access request message is used to allow the UE to attach to the base station, used to allow the UE to perform cell reselection to the base station, used to allow the UE to be handed over into the base station, or used to allow the UE to perform tracking area update.

4. The method of claim 1, wherein the connection request message is an initial message, or an Initial UE message.

5. The method of claim 1, wherein at least one of an Access Point Name (APN) and a closed subscriber group identifier (CSG ID) is further considered in the determination step.

6. The method of claim 1, wherein the base station is an (e)NodeB or a Home (e)NodeB, and the network entity is a Mobility Management Entity (MME) or a Serving General Packet Radio Service (GPRS) Support Node (SGSN).

7. The method of claim 1, further comprising:
transmitting a session request message including an address of the local gateway to a serving gateway; and
receiving a session response message from the serving gateway, prior to transmitting the connection response message when it is set to a path through nodes within the another wired network.

8. The method of claim 1, wherein the local gateway is a local Packet Data Network (PDN) Gateway (P-GW) or a local Combined Gateway General Packet Radio Service (GPRS) Support Node (CGSN).

9. The method of claim 1, wherein the wired network accessible by the local gateway is a public network different from the mobile communication network, or a local network in a home or company.

10. A network entity in charge of a control plane within a mobile communication network, the network entity comprising:
a Radio Frequency Unit (RF unit); and
a processor,
wherein the processor is configured to receive a connection request message when a base station receives a Radio Resource Control (RRC) message including an access request message from a User Equipment (UE), and to determine whether a bearer for the UE is set to a path through nodes within the mobile communication network or set to a path through nodes within another wired network accessible by a local gateway, by considering Quality of Service (QoS), subscriber information for the UE, operator policy and capability information if the connection request message is received, and to transmit a connection response message if it is determined that the bearer is set to a path through nodes within the another wired network, wherein the connection response message includes a parameter indicating whether the bearer has been set or should be set to a path through nodes within the another wired network and an address of the local gateway to the base station,
wherein the connection request message is generated by extracting an Attach Request message from the UE and by adding an identifier of a local gateway and capability information indicating whether the base station supports Selected Internet Protocol Traffic Offload (SIPTO), and
wherein the connection request message and the connection response message are S1 Application Protocol (S1-AP) messages.

* * * * *